2 Sheets—Sheet 1.
J. BACHELDER.
Sewing Machine.
No. 617.
Reissued Nov. 2, 1858.
Fig. 1,
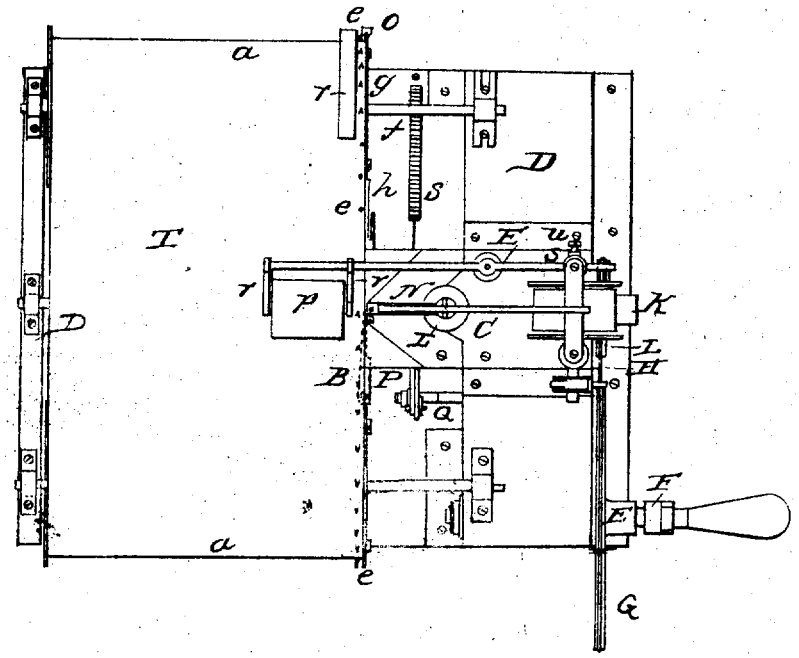
Fig. 2,
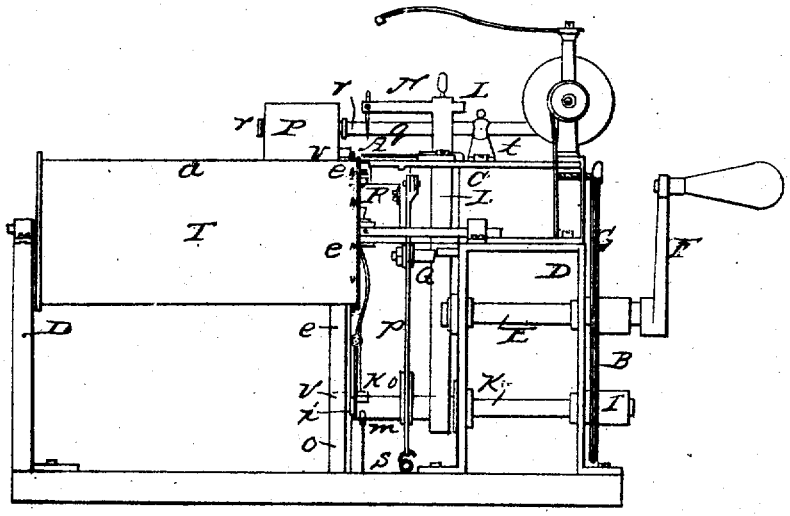

2 Sheets—Sheet 2.
J. BACHELDER.
Sewing Machine.
No. 617. Reissued Nov. 2, 1858.
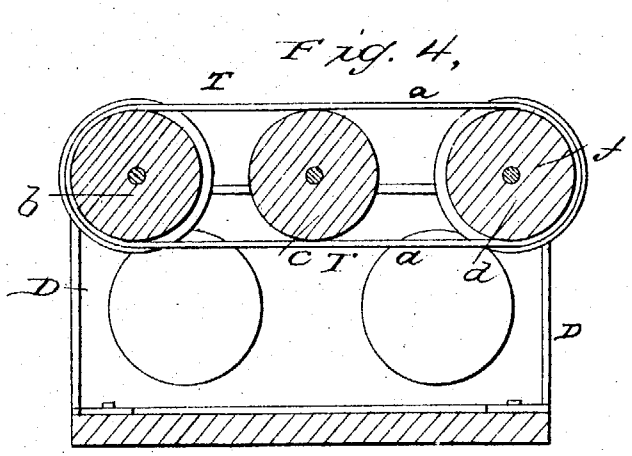
Fig. 4,
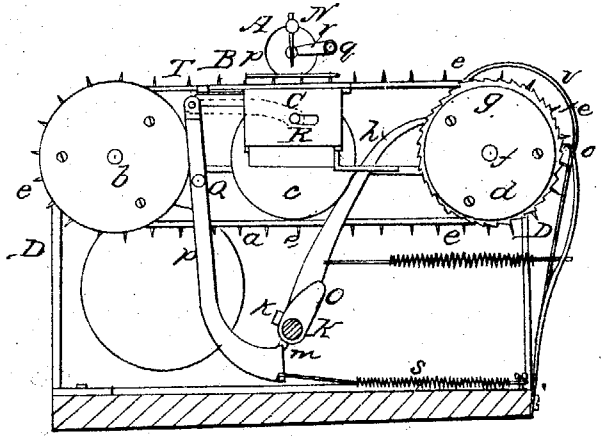
Fig. 5,
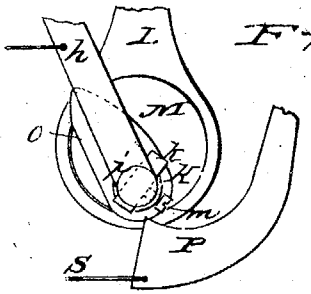
Fig. 6,
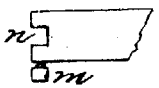
Fig. 7,
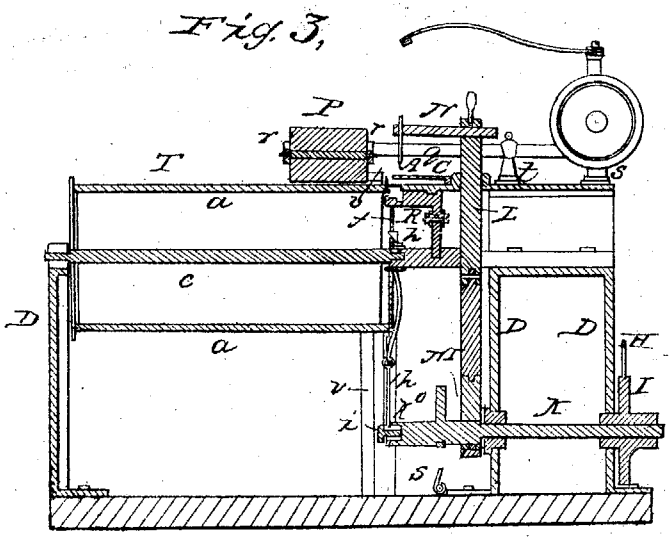
Fig. 3,

UNITED STATES PATENT OFFICE.

ISAAC M. SINGER AND EDWD. CLARK, OF NEW YORK, N. Y., ASSIGNEES OF JOHN BACHELDER.

IMPROVEMENT IN SEWING-MACHINES.

Specification forming part of Letters Patent No. 6,439, dated May 8, 1849; Reissue No. 617, dated November 2, 1858.

*To all whom it may concern:*

Be it known that JOHN BACHELDER, of the city of Boston, in the county of Suffolk and State of Massachusetts, invented a new and useful Improvement in Sewing-Machines; and we do hereby declare that the same is fully described and represented in the following specification and accompanying drawings, letters, figures, and references thereof.

Of the said drawings, Figure I denotes a top view of his improved sewing-machine. Fig. II is a front elevation of it. Fig. III is a vertical central and longitudinal section of it. Fig. IV is a transverse and vertical section taken through the middle of the endless cloth-holder. Fig. V is a vertical and transverse section of the machine, the same being taken through the cam which effects the retraction of the stitch-hook, and as if the spectator were looking toward the cloth-holder.

The mechanism for sewing, to which the said improvement is added, does not essentially differ from that known as the "Morey sewing-machine," which is understood to have been the joint invention of Charles C. Morey and Joseph B. Johnson, of the State of Massachusetts. His machine makes the chain-stitch by means of a hook and needle operating together, and his improvement is to be found in the mechanism for supporting the cloth and moving it under the needle with a regular intermittent motion; and it consists in the employment of a support for the cloth, having a motion in the direction of the seam alternated with rests or pauses to space the stitches; a means of holding the cloth upon the line of the seam and under the needle; a yielding pressure upon the cloth to aid the pins in holding the cloth and keeping it in proper place; a yielding plate beneath the needle and over the cloth at the point when the stitch is taken to hold the cloth down when the needle ascends, and a device to release the cloth from the feeding-surface when the seam is completed.

In the drawings above mentioned, or in such of them as the same are represented, A denotes the needle; B, the hook, (which in Fig. I is exhibited in red lines, as it is covered in the machine by a plate, C;) D, the frame-work of the machine; E, the driving-shaft; F, the crank of said driving-shaft; G, a grooved pulley fixed on the driving-shaft; H, an endless band passing around the pulley and a smaller pulley, I, fixed on the cam-shaft K; L, the needle-slide, which is elevated and depressed by an eccentric, M, and has an arm, N, extending from it for supporting the needle, as seen in the section, Fig. III.

O is the cam, which in part actuates the stitch-hook. The said cam is fixed on the cam-shaft K, and works against a lever, P, which turns on a fulcrum or pin, Q, and is jointed at its upper end to the carriage R of the stitch-hook. The said carriage R supports the stitch-hook on its upper surface. The retraction of the lever P is effected by a spring, S.

We have represented in the drawings various other parts of the sewing-machine, which are common to the said Morey sewing-machine, and such as are in no way claimed to be any portion of his invention. Those which we have before enumerated, as well as others which we have not referred to, but which may be observed in the drawings, we have described or represented merely for the purpose of distinguishing what is old and in common use, and to which his said invention or improvement is to be applied.

His improved cloth-holder is seen at T. It consists of an endless belt, *a*, supported by and running around three or any other suitable number of cylindric rollers, *b c d*, disposed with respect to the same and the needle and hook, as seen in the drawings. A series of pointed wires, *e e*, &c., is fixed in and made to project from the external surface of the cloth-holder, and near the edge thereof which is immediately adjacent to the needle. They (the said wires) may be placed at regular or irregular distances asunder, as occasion may require.

On the shaft *f* of one of the cylindric rollers which support the endless cloth-holder is affixed a ratchet-wheel, *g*. This wheel has an impelling-pawl, *h*, applied to it, the lower end of the said pawl being connected to the end of the crank-shaft by a small crank-pin, *i*, or crank whose position or distance from the axis of rotation of the shaft may be adjusted at pleasure. For this purpose the end of the cam-shaft has a slide, *k*, fitted into a recess made in the shaft and across its end. This slide is held within the recess by a clamp-screw, the crank-pin *i* being made to project from the slide. An end view of the shaft-slide and clamp-screw is given in the Fig. VI, in which *k* is the slide, K the cam-shaft, and *m* the clamping-screw. Fig. VII is a side view of a portion of the above shaft, showing the recess *n* for the reception of the slide.

By means of the afore-described adjustment the extent of the longitudinal movements of the impelling-pawl may be regulated at pleasure, and so as to regulate the length of the stitch. A spring-catch or holdfast, *o*, is applied to the ratchet-wheel for the purpose of keeping it in place at the expiration of each partial rotation or movement of it by its impelling-pawl.

A heavy pressure-roller, *p*, is placed on the endless belt and over the middle roller, *c*. It is supported by means of a shaft or rod, *q*, and two arms, *r r*, projected therefrom, the said shaft *q* being made to rest and slide loosely in bearings formed in the two standards *s t*, one of which has a clamping-screw, *u*, passed through it for the purpose of clamping the shaft, so as to prevent it from moving.

A curved piece of metal, *v*, is disposed with respect to the endless belt or cloth-conveyer, as seen in the drawings. Its upper end is bent over and down upon the top of the belt in such manner as to cause the cloth, when it is carried toward and against it by the butt, to rise upon and over it (the piece *v*) and from the points of the butt. In other words, the piece *v* frees or separates the cloth from the points after it is sewed.

The cloth to be sewed is laid upon the top of the endless belt or cloth-holder T, and is pressed down upon the points thereof. The machine being put in motion, the cloth is carried forward, passes under the needle, is sewed, and finally passes up the bent piece *v* and off the belt T.

He did not intend to confine his invention to the use of an endless belt alone, as a revolving circular table or a cylinder might be substituted therefor, the points being inserted in or made to project from the curved surface of either of them.

What is claimed as his invention, and what we, as his assignees, desire to secure by Letters Patent, is—

The combination of mechanism, substantially such as is herein described, so that the cloth or other fabric to be sewed, being placed upon the machine, will be automatically fastened onto the feeding apparatus, carried forward to receive the stitches, and discharged from the feeding apparatus, substantially as herein described, and so that seams of any desired length may conveniently be sewed.

ISAAC M. SINGER.
EDWARD CLARK.

Attest:
JOHN S. HOLLINGSHEAD,
J. WELLS.